(12) United States Patent
Kapur et al.

(10) Patent No.: US 8,048,371 B1
(45) Date of Patent: *Nov. 1, 2011

(54) FAIL-CLOSED ADAPTIVE MEMBRANE STRUCTURE

(75) Inventors: Vivek Kapur, Kennett Square, PA (US); Joseph D. Trentacosta, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1024 days.

This patent is subject to a terminal disclaimer.

(21) Appl. No.: 11/584,927

(22) Filed: Oct. 23, 2006

(51) Int. Cl.
*C12Q 1/68* (2006.01)
*A41D 27/02* (2006.01)

(52) U.S. Cl. .............................. 422/50; 2/272
(58) Field of Classification Search ............... 422/50; 2/272
See application file for complete search history.

(56) References Cited

U.S. PATENT DOCUMENTS

| | | | | |
|---|---|---|---|---|
| 3,853,268 A | * | 12/1974 | Schneider | 236/48 R |
| 4,158,368 A | * | 6/1979 | Clark | 137/487.5 |
| 4,420,521 A | * | 12/1983 | Carr | 428/74 |
| 4,515,761 A | | 5/1985 | Plotzker | |
| 4,538,642 A | * | 9/1985 | Schutten et al. | 137/625.28 |
| 5,235,967 A | * | 8/1993 | Arbisi et al. | 601/101 |
| 5,446,927 A | * | 9/1995 | Weldon | 2/243.1 |
| 6,263,511 B1 | * | 7/2001 | Moretti | 2/97 |
| 6,319,599 B1 | * | 11/2001 | Buckley | 428/308.4 |
| 6,579,948 B1 | | 6/2003 | Tan et al. | |
| 7,140,048 B2 | * | 11/2006 | Wallerstein | 2/272 |
| 7,465,490 B2 | * | 12/2008 | Von Blucher | 428/316.6 |
| 7,597,855 B2 | * | 10/2009 | Trentacosta et al. | 422/119 |
| 7,625,624 B2 | * | 12/2009 | Trentacosta et al. | 428/137 |
| 2004/0086390 A1 | * | 5/2004 | Burns et al. | 417/48 |
| 2006/0234573 A1 | * | 10/2006 | Rock | 442/59 |
| 2007/0049814 A1 | * | 3/2007 | Muccio | 600/388 |

OTHER PUBLICATIONS

U.S. Appl. No. 11/118,961, filed Nov. 10, 2005, Joseph D. Trentacosta et al.

* cited by examiner

*Primary Examiner* — Lore Jarrett

(57) ABSTRACT

Porous adaptive membrane structures having movable membranes are provided. The structures can be made to change their gas, liquid and/or particulate permeability in response to surrounding environmental conditions. Applications includes protective apparel that is comfortable to wear wherein the level of protection provided is based on conditions in the environment. Hence, the protective apparel is highly breathable and comfortable in a non-hazardous environment but impermeable or only semipermeable in a hazardous environment.

4 Claims, 10 Drawing Sheets

FAIL-CLOSED ADAPTIVE MEMBRANE STRUCTURE

TECHNICAL FIELD

The present invention relates to an adaptive membrane structures having movable membranes.

BACKGROUND

There is a growing need for personal protective apparel that guards against toxic chemical and biological agents. These agents may be
  (a) accidentally released in a chemical manufacturing plant, in a scientific or medical laboratory or in a hospital;
  (b) released intentionally during wartime by a government to attack the military forces of the opposition; or
  (c) released during peacetime by criminal or terrorist organizations with the purpose of creating mayhem, fear and widespread destruction.

For this reason, the United States military and other defense organizations of countries all over the world have sought to provide adequate protection against chemical and biological warfare agents. The need for such protective apparel also extends to police departments, fire departments, emergency responders and health care providers. These organizations are responsible for providing assistance and relief after a catastrophic release of chemical or biological toxins, but they cannot discharge their responsibilities without adequate protection ("Chemical Protective Clothing for Law Enforcement Patrol Officers and Emergency Medical Services when Responding to Terrorism with Chemical Weapons", Arca, V. J. and Marshall, S. M., in report of the Chemical Weapons, Improved Response Program, U.S. Army Soldier and Biological Chemical Command, November 1999).

According to the *Handbook of Chemical and Biological Warfare Agents* (D. Hank Ellison, CRC Press, Boca Raton, Fla., 1st edition, 1999), most chemical warfare toxins are fatal at concentrations as low as 1 part per million (ppm). Hence, to provide adequate protection from chemical warfare agents, a protective suit has to be almost impermeable to such chemicals. It is not difficult to devise structures that are impermeable to toxic chemical vapors and liquids, but such structures are also hot, heavy and uncomfortable to wear. The degree of comfort offered by a protective suit is largely determined by the amount of water vapor that can permeate through the protective fabric. The human body continuously perspires water vapor as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, in addition to offering the highest levels of protection against toxic chemicals and liquids, a practical chemical and biological protective suit generally should have relatively high water vapor transmission rates. Desirable protective structure are also light in weight and offer the same high level of protection over a long period of time.

Some currently available protective garments offer the same constant level of protection at all times, but often, protection is only needed when a toxic chemical or biological agent is present in the environment. Further, comfort is typically sacrificed at the expense of protection or vice versa. A garment is needed that provides a variable and controllable permeability.

U.S. application Ser. No. 11/118,961, which is incorporated in its entirety as a part hereof for all purposes, addresses these problems by providing an adaptive membrane structure having two membranes and means to respond to an actuating stimulus (for example, an electrostatic force) that will move one membrane into contact with the other such that the permeability of the structure to gas, vapor, liquid and/or particulates is decreased.

An adaptive membrane structure as described in this reference may, however, be used to protect against extremely toxic agents, such as those encountered in chemical and biological warfare. If the actuating stimulus should fail for some reason to bring the adjacent surfaces of the two membranes together in a manner such that a good quality seal is provided, protection against toxic agents may not be adequate for some conditions. Malfunction of the actuating stimulus, and a poor seal between adjacent membranes as a consequence, could result from a variety of causes such as damage to the membrane structure. Under other circumstances, however, the actuating stimulus could simply be too weak to adequately perform the job of moving adjacent membranes together in a manner such that a good seal between them is obtained.

It is thus desirable in such situations to consider an alternative to the above described adaptive membrane structure wherein the seal between adjacent membranes would not be provided as a result of an actuating stimulus.

SUMMARY OF THE INVENTION

One aspect of the present invention is an adaptive membrane structure comprising first and second membranes, and means to respond to an actuating stimulus that moves the first membrane, or a portion thereof, into a position in which it is separated from the second membrane, or a portion thereof, by a gap between them.

Another aspect of the present invention is an article of manufacture comprising an adaptive membrane structure comprising first and second membranes, and means to respond to an actuating stimulus that moves the first membrane, or a portion thereof, into a position in which it is separated from the second membrane, or a portion thereof, by a gap between them. Such articles include apparel, enclosures, sensor devices, and valves for controlling the flow of gas, vapor, liquid and/or particulates.

DETAILED DESCRIPTION

Figure 1A:
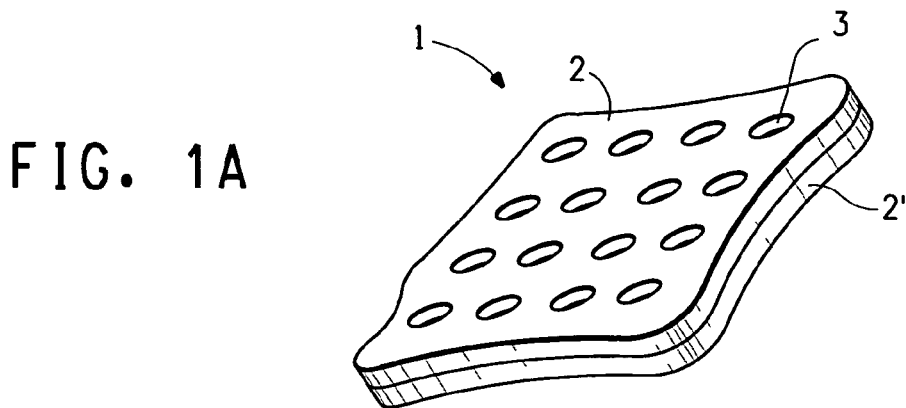
FIG. 1 is a schematic diagram of an adaptive membrane structure showing two membranes in contact in the absence of an actuating stimulus (1A: perspective view), and showing an absence of registration of holes on adjacent membranes (1B: plan view and 1C: sectional view).

The present invention allows the manufacture of protective garments and other protective structures by providing an adaptive membrane structure. An "adaptive membrane structure" is a structure comprising at least two membranes wherein the membranes are movable upon the activation or application of an actuating stimulus such as a force. The membrane structure is thus "adaptive" in the sense that the permeability of the structure can be changed based on the conditions in the external environment. Permeability as used herein is defined as the mass transported per unit area of a membrane or membrane structure, per unit time per unit driving force where the driving force is the difference in concentration of the species of interest on the opposite sides of the membrane or membrane structure.

A "membrane" as used herein is a discrete, thin article that moderates the transport of species in contact with it, such as gas, vapor, aerosol, liquid and/or particulates. Examples of membranes include without limitation film, plastic sheeting, synthetic barriers, layers, laminar structures, woven fabric, and nonwoven sheet. A membrane may be chemically or physically homogeneous or heterogeneous. A "microporous membrane" is a membrane typically containing pores in the range of 0.1 to 10 micrometers in diameter. Microporous membranes are typically characterized by the fraction of total membrane volume that is porous (i.e. relating to porosity), a term reflecting the average pore length within the membrane as compared with membrane thickness (i.e. relating to tortuosity), and average pore diameter. The term "pore" as used herein denotes an opening that exists in a membrane that may or may not completely traverse the membrane. Typically, the pore size, the pore shape and/or the pore placement is not well defined or controlled, though there may be a relatively reproducible average pore size and/or pore size distribution.

The movable membranes used in the structures disclosed herein typically have holes as distinguished from pores, a "hole" being an opening that completely traverses a membrane. In FIGS. 1C and 2C, membrane 2 has holes 3 and membrane 2' has holes 3'. The holes of one membrane may or may not be the same size and shape as the holes of another membrane. Although holes are described herein in terms of their having the shape of a circle, it is not required that a hole have a shape that is perfectly or even approximately circular.

The holes of one membrane may be aligned with the holes of another membrane, in the sense of lines perpendicular or essentially perpendicular to the respective planes of the membranes in the side elevation view of the structure, such that the holes overlap completely, partially or not at all. Holes overlap completely when, if they are the same size, their boundaries are coincident in vertical alignment, or if they are not the same size, the area of the smaller hole fits entirely within the area of the larger hole. Holes do not overlap at all when, again in the sense of vertical alignment, a line perpendicular or essentially perpendicular to the respective planes of the membranes from its point of exit from a hole in one membrane does not enter into any part of a hole on the other membrane. Membranes with holes that have no overlap are shown in FIGS. 1C and 2C. A line, for example, that is perpendicular or essentially perpendicular to the respective planes of membranes 2 and 2' and that exits from any of holes 3 would not enter into any hole 3'. Partial overlap is the intermediate condition when the perpendicular or essentially perpendicular line exiting from a hole on one membrane will enter into only a portion of a hole on the other membrane.

In the description in the preceding paragraph, a line that is perpendicular or essentially perpendicular to the plane of a membrane will pass all the way through a hole in such membrane only if the hole is essentially a right circular cylindrical hole. The above description concerning overlap of holes is nevertheless accurate for membranes that have holes in which the axis of the hole is not normal to the plane of the membrane or is tortuous because the portion of a line passing through such hole that is relevant to the determination of overlap of holes is the portion of the line from its exit point from a hole on one membrane to the point of its entry, if any, into a hole on another membrane. That portion of the line may be described as perpendicular or essentially perpendicular to the plane of one or both membranes regardless of the route it has taken in passing through any of the holes.

The term "open area" is used to refer to the extent, expressed as a percentage, to which the respective holes of two membranes overlap, as most easily envisioned in terms of a plan view of the structure from the top. For membranes that do not overlap at all, such as those of FIGS. 1C and 2C, the open area is defined as 0%. Conversely, an open area of 100% corresponds to the existence of the maximum open area, which is achievable by arranging a particular set of membranes such that the holes completely overlap, and these holes are referred to as "in registration". A percentage between 0 and 100 indicates partial overlap. The terms "not in registration" and, equivalently, "out of registration" are used herein to indicate that the holes in two membranes do not overlap at all (referring again, for example, to FIGS. 1C and 2C); this is equivalent to having an open area of 0%. The terms "substantially out of registration" and "partially in registration" indicate that there is partial overlap, i.e. that the open area of the membrane structure is in the range of from greater than 0% up to, but not including, 50%. In FIGS. 1C and 2C, for example, holes 3 are out of registration with holes 3'.

The degree of registration of the holes of two membranes may be described with equal accuracy as set forth above regardless of whether or not the membranes are in contact. The vertical alignment of the holes with respect to each other, in a side elevation view, may be described with equal accuracy in terms of lines perpendicular or essentially perpendicular to the respective planes of the membranes having holes despite the fact that such lines might pass through a gap that separates the two membranes in the case where they are not in contact.

The adaptive membrane structure may be "actuated", which denotes the state of the structure upon the application or operation of a stimulus, such as a force (the "actuating stimulus"), which causes adjacent membranes to move into a position in which the membranes are separated by a gap between them, thereby changing the permeability of the membrane structure. Adjacent membranes, or a side thereof or a layer thereon, are membranes, sides or layers that may be brought into contact with each other. The term "unactuated" thus denotes the state of the adaptive membrane structure before application of the actuating stimulus, in which state either no gap exists between membranes that are in contact with each other, or a small gap exists between the membranes that is made larger when the membranes move away from each other upon application of the actuating stimulus. The term "deactuated" denotes the state of the adaptive membrane structure after the application and subsequent removal of the actuating stimulus when accompanied by a reduction or total elimination of the gap between adjacent membranes that had existed as a result of the application to the structure of an actuating stimulus.

The term "adaptive barrier system" as used herein denotes a system comprising an adaptive membrane structure in which actuation changes the permeability of the membrane structure to chemical, biological and/or particulate species.

Thus, the adaptive membrane structure is capable of displaying a variety of states of gas, vapor, liquid and/or particulate permeability. For example, when the membrane structure is used for protection against hazardous agents, it can display two different states of permeability. In one state, when hazardous environmental conditions do not exist, the membrane structure is highly permeable to water vapor and gases, thereby offering a high level of personal comfort. The term "actuated" is used herein to denote this state because the existence of a gap between membranes is what permits a high degree of permeability and transport of species through the structure. When the membrane structure is exposed to a hazardous environment, it is transformed to another state, in which it is impermeable to hazardous chemical and/or biological toxins and/or pathogens, thereby offering a high level of protection when it is needed. This is the deactuated state in which it is desired that no gap be provided between membranes in the structure. In the deactuated or unactuated state, the structure may, however, remain permeable to water vapor.

The conversion of the membrane from one state of permeability to another state of permeability is brought about by the application of a stimulus, such as a force, herein termed an "actuating stimulus". The actuating stimulus can be any of several forms including without limitation pressure, force, change in temperature or ambient concentration of water vapor, voltage, current, magnetic field, and electric field. In one embodiment of this invention, the actuating stimulus takes the form of an applied electric field, which causes membranes within the structure to move to convert the structure from an unactuated to an actuated state.

The application of the actuating stimulus could be effected with a manually operated switch. In an alternative embodiment, however, a sensor could detect a change in the environment in which the structure is located, and could automatically activate the actuating stimulus. The sensor could do this by responding, for example, to a change in temperature or humidity or to the presence (as indicated by change of concentration) of an undesirable chemical, biological and/or particulate species by sending a signal (for example, an electrical, optical or radio wave signal) to close a circuit to activate, i.e. trigger the application of, the actuating stimulus.

In a preferred embodiment, a sensor would respond to the presence of an undesirable chemical and/or biological species by sending a signal (for example, an electrical, optical, or radio wave signal) to trigger the application of the actuating stimulus.

Figure 1B:
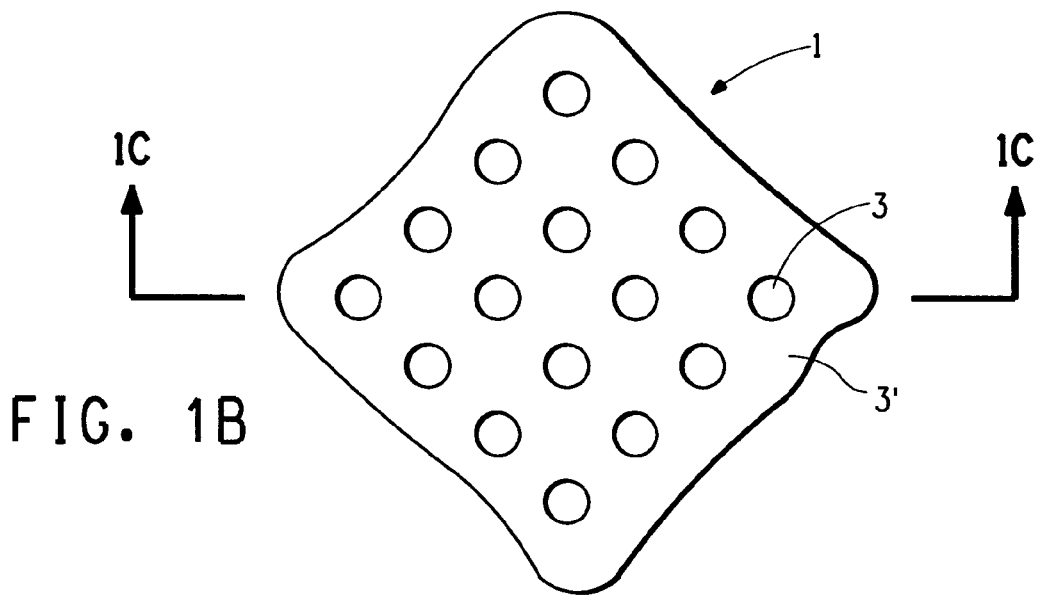
Figure 1C:
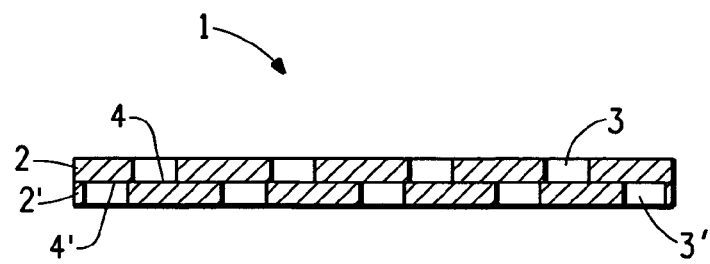
Figure 2A:
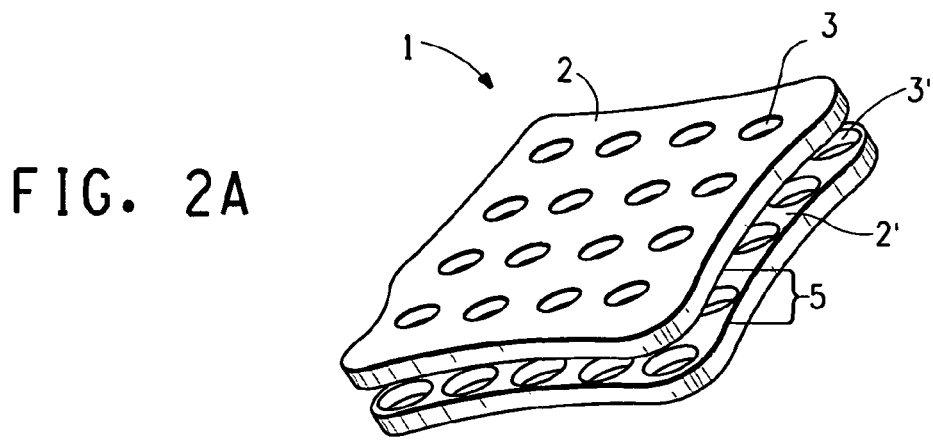
FIG. 2 is a schematic diagram of an adaptive membrane structure showing two membranes separated by a gap between them as a result of the application of an actuating stimulus (2A: perspective view), and showing an absence of registration of holes on adjacent membranes (2B: plan view and 2C: sectional view).
Figure 2B:
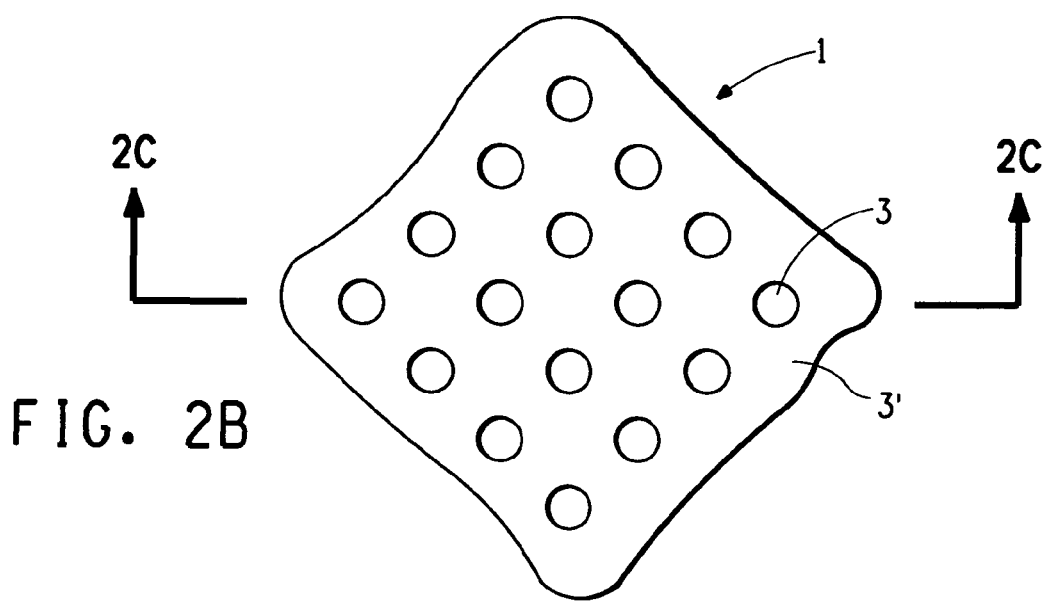
Figure 2C:
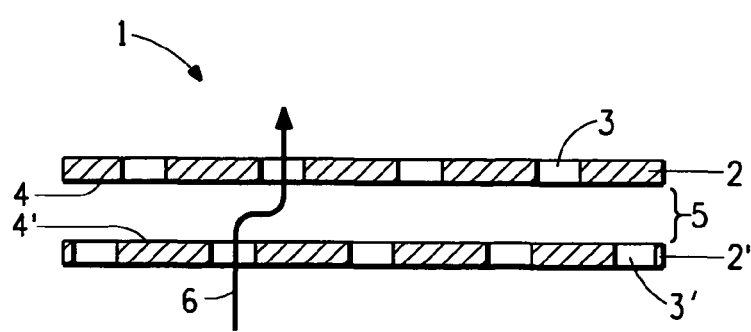

A schematic of an illustrative preferred embodiment of an adaptive barrier system according to the present invention, in its unactuated state, comprising two membranes, is shown in FIGS. 1A, 1B and 1C. The structure comprises a pair of planar membranes 2 and 2' that are largely parallel to each other, each membrane further comprising a geometric array of holes such as those denoted 3 and 3' in FIGS. 1A, 1B and 1C. The holes completely traverse the thickness of the membranes, giving rise to a path of increased convection and/or diffusion of a chemical, biological, or particulate species across the membrane thickness when compared to convection and/or diffusion of the same species through the membrane material surrounding the hole. In the absence of an actuating stimulus, i.e. when the adaptive barrier system is not actuated, the adjacent surfaces 4 and 4' of the membrane pair 2 and 2' are typically in contact with each other. In an alternative embodiment of the unactuated state, however, a small gap may exist between the membranes that is not sufficient for a substantial amount of permeability of the structure, and thus does not permit a desirable amount of transport across the structure of harmless species such as water vapor. When an actuating force is applied to the adaptive barrier system, surfaces 4 and 4' of the membrane pair 2 and 2' are forced apart and away from each other, thus creating a gap 5 between 2 and 2', as shown in FIGS. 2A, 2B and 2C. In the actuated state, the membranes 2 and 2' have been moved to a position in which they are separated by a gap 5 between them.

The holes completely traverse the thickness of the membranes, giving rise to a path of increased convection and/or diffusion of a chemical, biological, or particulate species across the membrane thickness when compared to convection and/or diffusion of the same species through the material from which the membrane is made at a location surrounding the hole.

It is a further characteristic of the invention that the arrays of holes in at least two of the membranes are such that the openings of the array of holes on the adjacent membrane surfaces 4 and 4' are substantially out of registration with each other. That is, the degree of hole overlap is such that the open area is reduced to less than about 50%. It is preferred that the open area be reduced to about 10% or less, more preferred that it be reduced to about 1% or less, and most preferred that the open area be reduced to 0%. In this most preferred embodiment of the present invention, no hole opening on the surface 4 of the membrane 2 will come in contact with a hole opening on the adjacent surface 4' of the membrane 2' when the membranes are in contact. When the two adjacent membranes 2 and 2' are in contact, the holes of each membrane are thus effectively sealed, and there is no continuous porous path for convection and/or diffusion of chemical, biological, or other particulate species across two adjacent membranes, as seen in FIG. 1C. However, when the two adjacent membrane surfaces 4 and 4' are not in contact, chemical, biological, or other particulate species may traverse one membrane through its holes (see, e.g., flow path 6 in FIG. 2C), enter the gap between the non-contacting membranes, and then traverse the second membrane through its holes (see, e.g., flow path 6 in FIG. 2C). The convection and/or diffusion of species will be greatly enhanced through membranes that are separated by a gap through action of the actuating force as compared to convection and/or diffusion of the same species when the same membranes are in contact, or are nearly so, in the absence of the actuating stimulus.

Figure 3A:
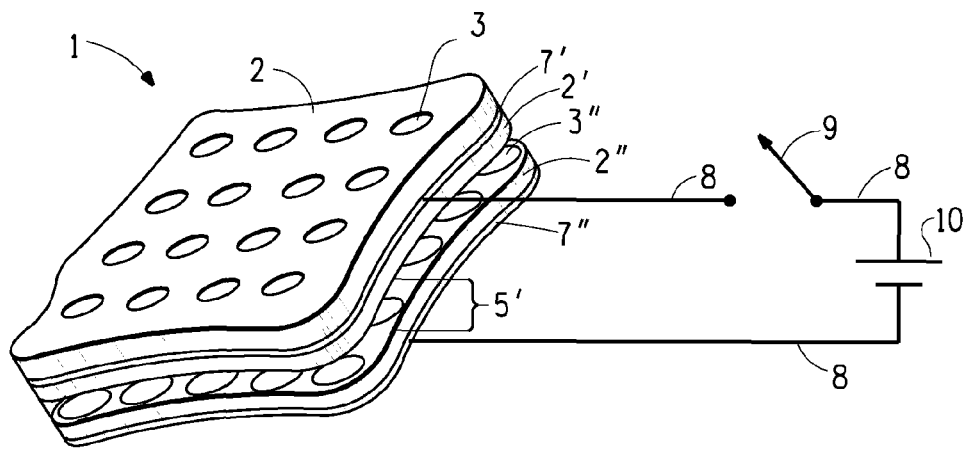
FIG. 3 is a schematic diagram of an adaptive membrane structure that contains three membranes showing the positions of the membranes in the absence of an actuating stimulus (3A: perspective view, 3B: plan view and 3C: sectional view).
Figure 3B:
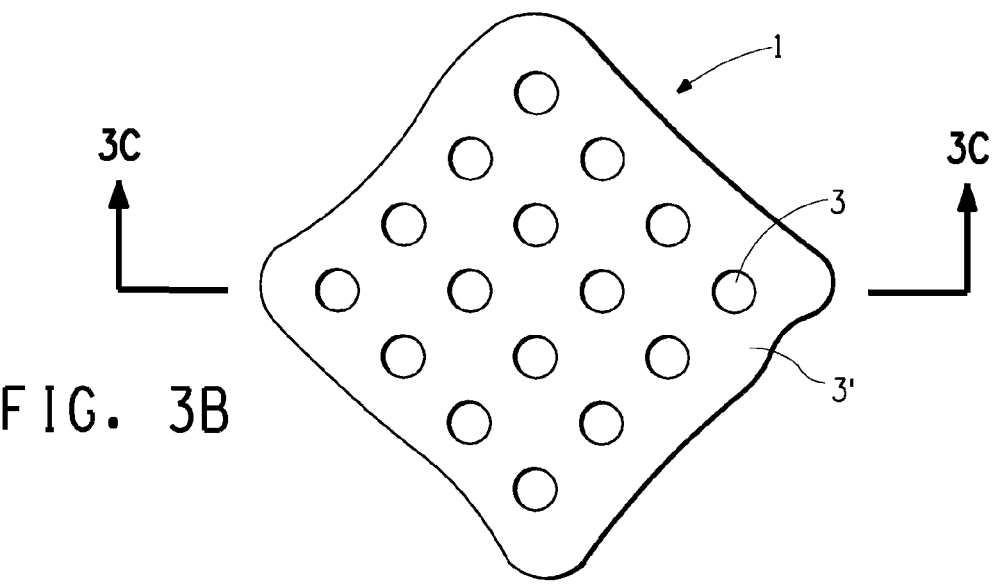
Figure 3C:
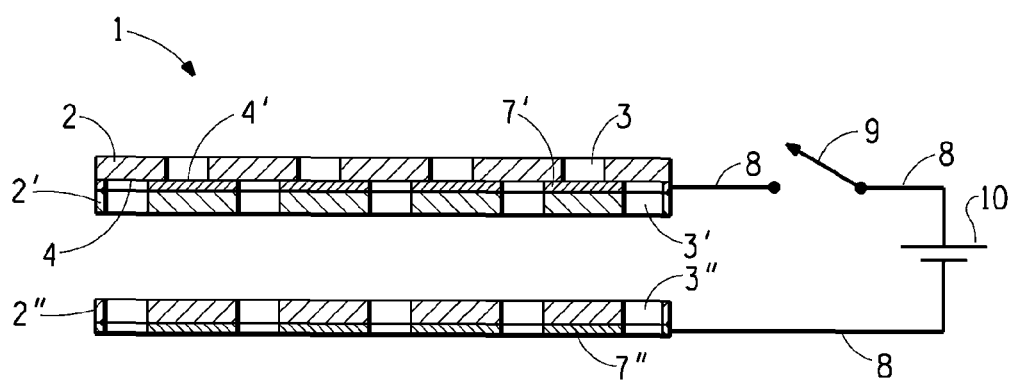
Figure 4A:
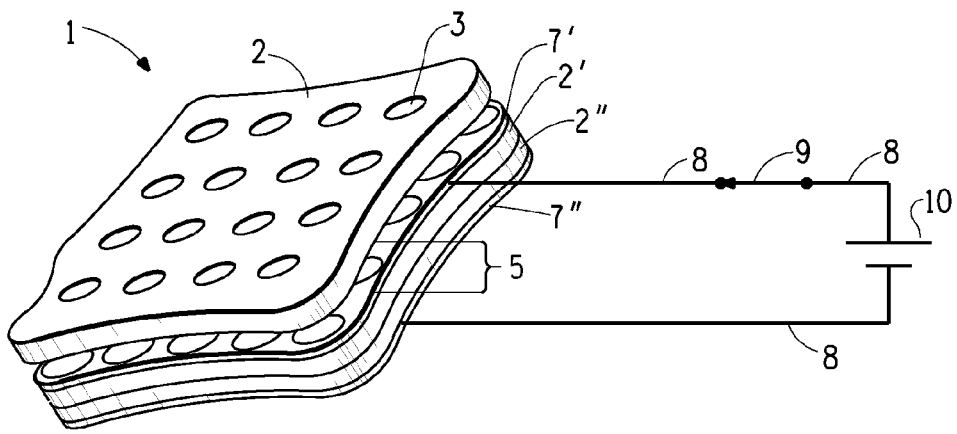
FIG. 4 is a schematic diagram of an adaptive membrane structure that contains three membranes showing the positions of the membranes as a result of the application of an actuating stimulus (4A: perspective view, 4B: plan view and 4C: sectional view).
Figure 4B:
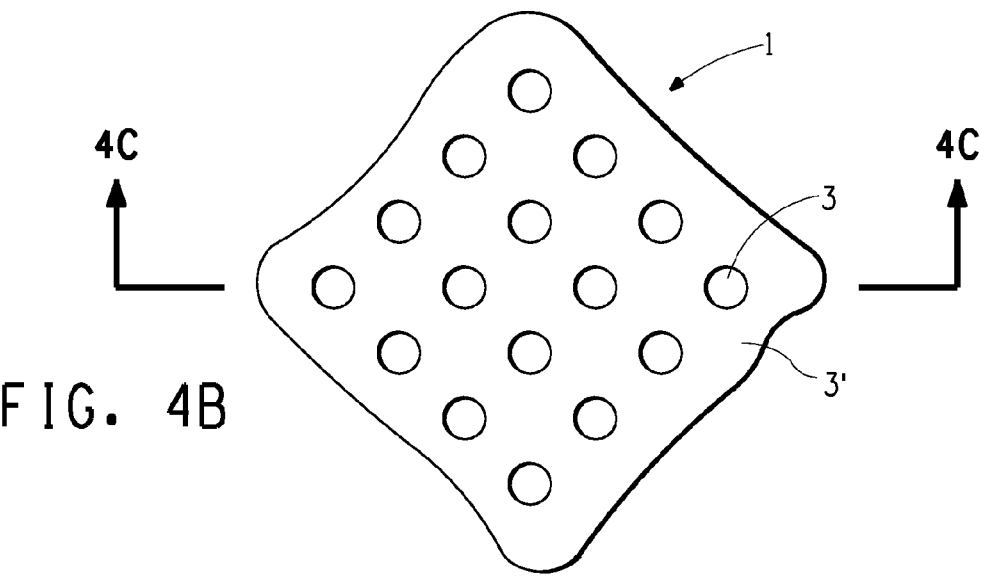
Figure 4C:
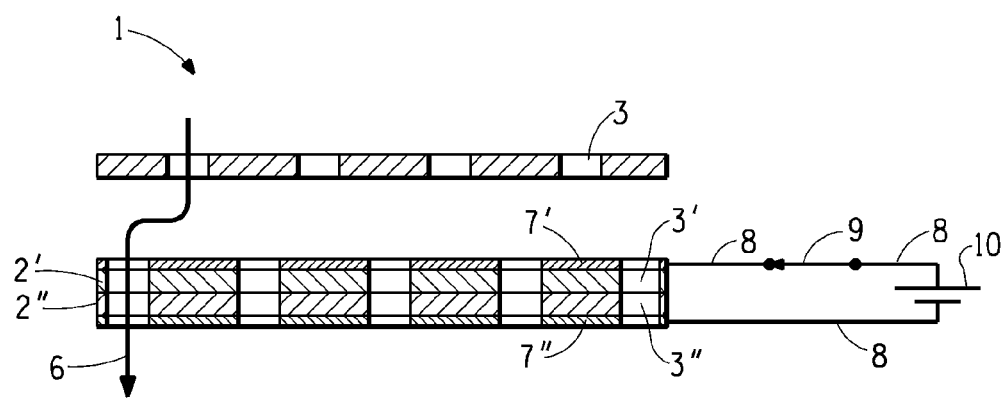

In a further alternative embodiment of the present invention, the adaptive membrane structure may contain more than two membranes, such as the structure containing three membranes as shown in FIGS. 3A, 3B and 3C, wherein there is an electrostatic actuating force. Membranes 2' and 2" have arrays of holes, such as those denoted 3' and 3", that are at least partially in registration, having an open area preferably equal to 100%, but each of these hole arrays is out of registration with the array of holes denoted by 3 in membrane 2. In the unactuated state, membranes 2 and 2' are in contact along the respective adjacent surfaces thereof 4 and 4', having been moved into contact with each other by means for moving membrane 2' into contact with membrane 2. Such means for moving a membrane may include a passive, constant force (not shown) that does not require activation, such as ferromagnetism, which is particularly useful for this purpose because it continues to hold membranes 2 and 2' in contact with each other after contact has first been made. Because the hole arrays of membranes 2 and 2' are at least substantially out-of-registration, this state is one of low permeability or impermeability, similar to that depicted in FIG. 1. The respective surfaces of membranes 2' and 2" that are not directly opposed to each other are coated with conducting layers 7' and 7". As depicted in FIGS. 3A and 3C, the two coated layers 7' and 7" are further connected in series with each other through conductors 8 to a switch 9 and a source of electrical potential 10 which may include a battery or other power source. When the switch 9 is closed, the adaptive membrane structure attains its actuated state as depicted in FIGS. 4A, 4B and 4C.

In this actuated state, the current is the actuating stimulus, and the conductor is the means to respond to the actuating stimulus. When the switch 9 is closed, an attractive electrostatic force exists between charges which develop on layers 7' and 7" thereby moving membrane 2' into a position in which it is separated from membrane 2 by a gap 5 between them, and also bringing membranes 2' and 2" in contact along their adjacent surfaces. Membrane 2' is drawn into contact with membrane 2" by way of an attractive electrostatic force, and since the arrays of holes 3' and 3" of membranes 2' and 2" are in-registration, this is a state of high permeability.

Note that membranes 2' and 2" essentially comprise a continuous or patterned electrode (not shown), and that the force of the means for moving membrane 2' into contact with membrane 2, and to hold them together in that idle state, would have to be overcome by the force generated by the response of the responding means to the actuating stimulus, in this case the response of conductors 7' and 7" to the electrical current. As shown in FIGS. 4A and 4C, a gap 5 now exists between the membranes 2 and 2', and chemical, biological or particulate species may traverse membrane 2 through its holes 3, enter the gap 5 between membranes 2 and 2', and then traverse membranes 2' and 2" through their holes which are in registration (see, e.g., flow path 6 in FIG. 4C) thereby making the actuated state of this structure one of high permeability.

Figure 5:
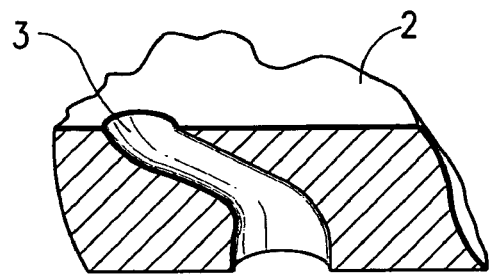
FIG. 5 is a schematic diagram of a section view of a membrane with a hole of non-circular cross-section.

Although the holes depicted in FIGS. 1 through 4 are right circular cylindrical holes with linear axes normal to the plane of the membranes, the holes used in the membranes disclosed herein are not limited to this geometry. In particular, each hole may have other non-circular cross-sectional shapes and/or inclinations of their axes relative to the plane of the membrane. Indeed, generally any such hole need not traverse the membrane along a linear path but may instead follow a non-linear, tortuous path. Furthermore, the cross-sectional shape of a hole need not be constant as the hole traverses the membrane. FIG. 5 shows a section view of part of a membrane according to the invention with a hole with non-circular cross-section, which changes in shape and size as it traverses the membrane along a general tortuous path.

The optimum hole diameter will vary depending on the specific application of the structure, particularly how much flow or diffusion is desired through holes in the actuated state. The holes are large enough to allow transport to occur in the actuated state.

Although the hole arrays depicted in FIGS. 1 through 4 comprise the same regular square pitch pattern, the hole arrays are not limited to this pattern. In particular, the array pattern on membrane 2 may be different from the pattern on membranes 2' and/or 2", and either pattern may comprise any regular or non-regular pitch pattern provided that the patterns are such that the holes of membrane 2 will be at least substantially out of registration, if not actually out of registration, with the corresponding holes of the membrane 2'. In contrast, the hole array geometries incorporated in membranes 2' and 2" are preferably identical.

Again referring to FIGS. 1A, 1B, 1C, 2A, 2B and 2C, the membranes 2, 2' and 2" may be fabricated from the same or different materials or combinations of materials and, furthermore, each membrane of the pair may have the same or different thickness. The materials from which the membranes are fabricated are selected to impart desirable levels of permeability to one or more species, which may come in contact with the membrane in use. For example, the material comprising the membrane may be selected to have high permeability to water vapor but very low permeability to one or more human toxic or poison agents or pathogens as may be encountered by military personnel subjected to a chemical warfare attack.

The materials that may be used to create membranes 2, 2' and 2" can be chosen from any sheet structure, but it is preferred that the sheet structure be flexible, and it is also preferred, although not necessary, that the materials used are polymeric in nature. Preferably, the flexible sheet structure may be prepared from at least one polymer component. Such polymer sheets or films, used to create membranes 2, 2' and 2", may be continuous (i.e. containing no microvoids or micropores) or microporous. Methods for creating polymer sheets or films are well known in the art. Such polymer sheets or films can be prepared from a large variety of polymers. Polymers that may be used for creating sheets or films include without limitation polyesters, polyolefins (especially high-performance polyethylene), polyamides (aliphatic, aromatic, and mixed aliphatic/aromatic), polybenzazoles, polyimides, polyacrylonitrile, polysulfones, polycarbonates, homopolymer and copolymers of tetrafluoroethylene, homopolymer and copolymers of vinylidene difluoride, copolymers of butadiene and styrene, copolymers of ethylene and vinyl acetate, copolymers of ethylene and vinyl alcohol, copolymers of ethylene and acrylic monomers such as methacrylic acid and acrylic acid, and ionomers. Nonlimiting examples of suitable ionomers include ionomers formed by neutralizing copolymers of ethylene acid copolymers, perfluorinated sulfonate and carboxylate ionomers, and sulfonated polystryrene.

Polymer films and sheets produced from thermoplastic and vulcanized elastomers such as, but not limited to, polyurethanes, block copolymers and random copolymers of styrene and butadiene, block copolymers and random copolymers of styrene and isoprene, homopolymers of butadiene and isoprene, copolymers of ethylene and propylene, fluoroelastomers, natural rubbers, nitrile rubbers, polyacrylate rubbers, butyl rubbers and silicone rubbers are also useful as membrane materials in the present invention.

Continuous polymer films to be used to create membranes 2, 2' and 2" may also be semipermeable in nature. Semipermeable polymer membranes and their manufacture are known, for example, from sources such as U.S. Pat. No. 4,515,761 (Plotzker) and U.S. Pat. No. 6,579,948 (Tan).

The starting materials to create the membranes used in the present invention are not limited to continuous polymer films. Suitable starting materials may also have microvoids or micropores such as those present in microporous membranes, in which the typical pore size is about 0.1 to 10 micrometers. Various methods for creating microporous membranes include the track-etch process used for creating Nuclepore® brand polyester and polycarbonate membranes (Whatman Inc., Clifton, N.J.);

phase inversion processes for creating polysulfone, aromatic polyamide, and polyvinylidene fluoride membranes;

stretching processes for creating microporous polytetrafluoroethylene and polyethylene membranes;

phase separation processes in which a nonreactive species ("porogen") present during a polymerization reaction is subsequently extracted from the polymer product; and spunbonded/melt blown processes for creating nonwoven sheet structures.

The membrane may also contain materials to adsorb, absorb or react with harmful and undesired species. Hence, the membrane may include activated carbon, high surface silica, molecular sieves, xerogels, ion exchange materials, powdered metal oxides, powdered metal hydroxides, antimicrobial agents, and the like, which may be in the form of nanoparticles if so desired. Such materials would typically be mixed into the membrane material during the membrane formation process, such as, which might include a process such as extrusion compounding or solution casting.

Holes, for the adaptive membrane structures, may be formed by any hole manufacturing process known in the art. Mechanical processes that may be used for creating holes in sheets and films include without limitation drilling, punching, piercing, boring and perforating. Holes may also be created by other methods such as ultrasonic waves, electrical discharge, high energy radiation such as lasers and electron beams, and high velocity water jets. Various etching techniques, whereby material is removed by chemical means, may also be used to create holes for this invention. A preferred hole manufacturing process for this invention is one in which material occupying the space where the hole is to be created is removed with the least amount of distortion to the material surrounding the hole. Methods for hole manufacturing that are especially preferred are mechanical punching and laser or electron beam drilling. Once the holes have been created, the membranes may be further processed to reduce any surface distortion that may have resulted due to hole formation process. Processes that may be used include without limitation calendaring, pressing and planishing.

An adaptive membrane structure may consequently be fabricated by a process of (i) providing at least two membranes, each independently comprising a flexible sheet, film, microporous membrane, or nonwoven layer; each membrane containing an array of holes, (ii) assembling the membranes parallel to each other such that the holes in adjacent membranes are substantially out of registration or are out of registration, and (iii) providing a means responsive to an actuating stimulus to the assembled membranes. In addition, an electrically conductive layer may be applied to one side of each of at least two of the membranes, and the electrically conductive layers may be attached to a voltage source and a switch. The holes may be made by at least one method selected from among mechanical drilling, punching, piercing, boring, perforating, drilling with ultrasonic waves, drilling by electrical discharge, laser drilling, electron beam drilling, and drilling with high velocity water jets.

As depicted in FIGS. 3A and 4A, the two coated layers on membranes 2' and 2" are connected in series with each other through conductors 8 to a switch 9 and a source of electrical potential 10 which may include a battery or other power source such as a solar panel or fuel cell. As shown in FIGS. 3A and 3C, when the switch is open, there is no electromotive force and thus no actuating stimulus. As shown in FIGS. 4A and 4C, however, when the switch is closed, an attractive electrostatic force develops between the membranes and thereby brings membranes 2' and 2" into contact along their adjacent surfaces.

A preferred actuating stimulus for use in this invention is thus the force produced by electrostatics. The preferred electrostatic force may be applied to the system by incorporating electrically conducting materials in or onto specific regions of at least two and possibly more membranes such that upon action of appropriate circuitry, the conducting regions on at least two membranes become oppositely charged, thereby creating an attractive force which brings two membranes into contact. Alternatively, however, the conducting regions on at least two membranes may be given the same charge, thereby creating a force of repulsion that separates the two membranes and creates a gap by moving them away from each other. In any of these electrically stimulated embodiments, therefore, means to respond to an actuating stimulus may include such electrically conducting materials, and the features, lines and patterns into which they may be formed, on which an electrostatic force may operate, with the current flow of the electrostatic force being designed to create an attractive or repulsive force as needed.

Possible metallic conductive coatings may include without limitation silver, aluminum, copper, nickel, palladium, platinum, gold and alloys of these metals. An electrically conductive coating may also be prepared by dispersing colloidal forms of the aforementioned or other conductive metals into various polymers. Electrically conductive layers or electrodes may also be prepared from carbon black, graphite, carbon nanotubes, fullerenes and dispersions of such forms of carbon into polymers. Additional forms of conductive layers or electrodes include those, which may be formed from indium tin oxide or from polymers that are inherently electrically conducting. Electrically conducting polymers include without limitation polyacetylene, polyaniline, polythiophenes, polypyrrole, poly(p-phenylene), poly(p-phenylene vinylene) or such conductive polymers that have been chemically modified, for example, with dopants to increase conductivity. The conducting layers 7' and 7" may comprise the same or different materials and thickness.

Figure 10A:
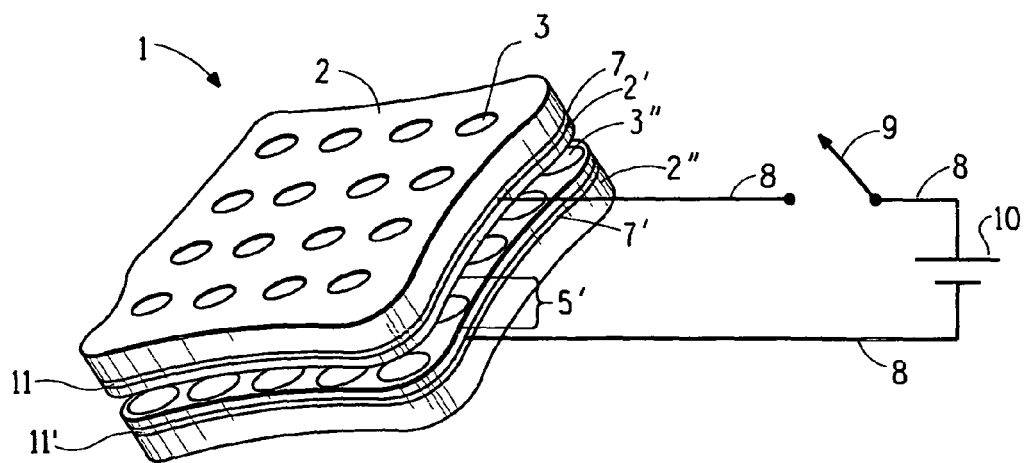
FIG. 10 is a schematic diagram of an adaptive membrane structure in which conductive layers are coated with dielectric material. (10A: perspective view. 10B: plan view. 10C: sectional view.)
Figure 10B:
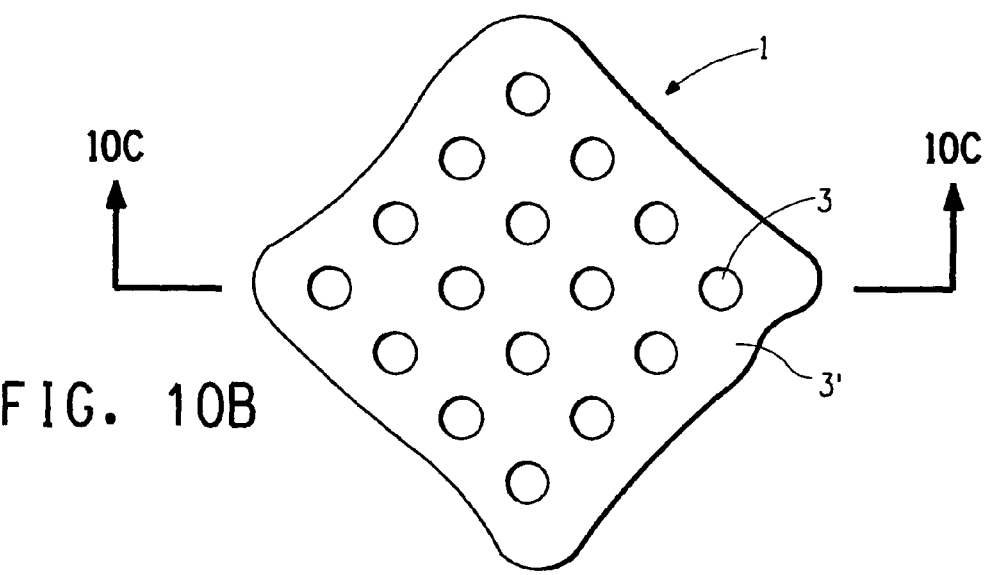
Figure 10C:
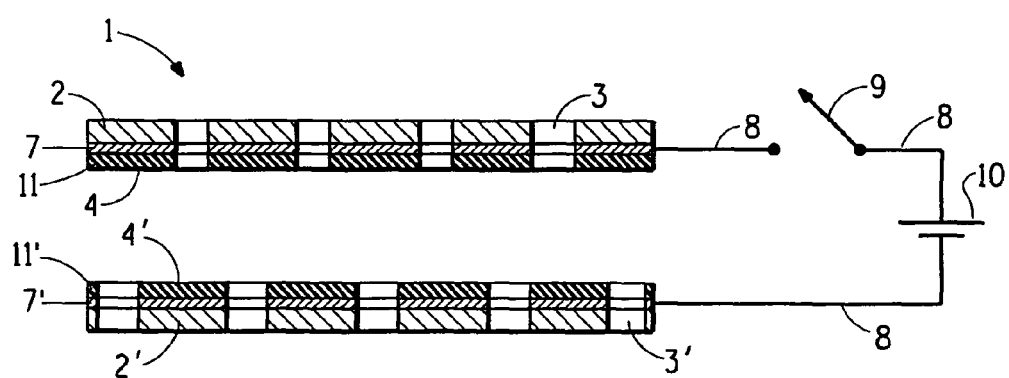
Figure 11A:
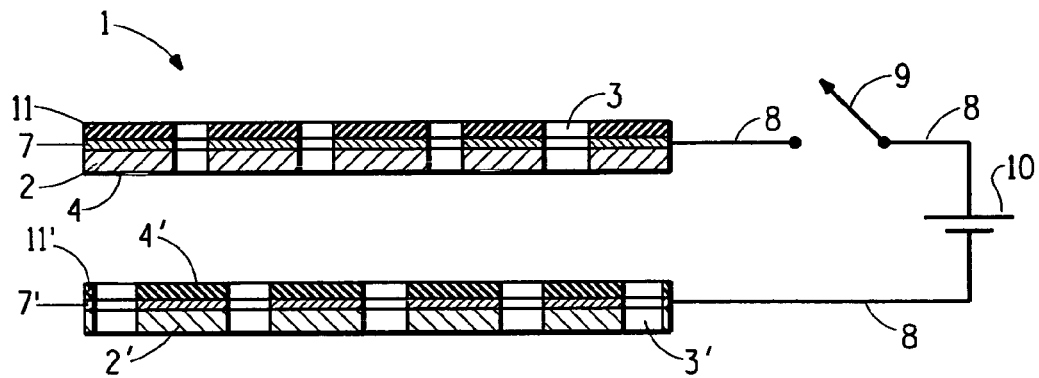
FIG. 11 is a schematic diagram of a sectional view of alternative configurations of an adaptive membrane structure comprising two substrate membranes, two conductive layers, and two dielectric coatings.

Additionally, as shown for example in FIGS. 10A, 10B and 10C, where membranes 2 and 2' are shown as having conductive layers 7 and 7', the conductive layers on each membrane may be coated with one or more dielectric layers 11 and 11', which can impart additional features to the membrane structure. In particular, these layers may serve to insulate the conductive layers 7 and 7' from the environment thereby eliminating or minimizing the potential for undesirable shorting or arcing of the charged conductive layer to surrounding conductive objects. The dielectric layers 11 and 11' may comprise the same or different materials and thickness. Furthermore, in general, the dielectric layers 11 and 11' may be the same material or a different material than that comprising the substrate membranes 2 and 2'. Note further that a dielectric layer may be installed on the side of membrane that is adjacent to another membrane, or on the opposite side. For example, in FIGS. 10A and 10C, dielectric layer 11 is on the side of membrane 2 that is adjacent to dielectric layer 11' on membrane 2'. In the embodiment shown in FIGS. 11A and 11B, however, dielectric layers 11 and 11' are not adjacent to each other.

Figure 11B:
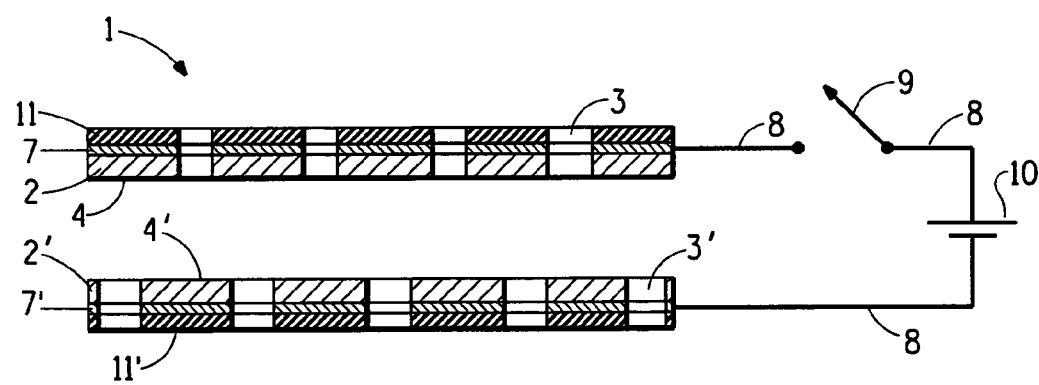

In the embodiments shown in FIG. 11B, it is preferred that the holes 3, in addition to fully penetrating the substrate membranes 2 and 2', also fully penetrate conductive layers 7 and 7' and also fully penetrate the dielectric layers 11 and 11'. It is not required, however, that in such case the holes 3 fully penetrate the conductive and dielectric layers, and either or both of those layers may instead cover the entire surface of that side of the membrane 2 and/or 2'. In such case, the permeability of the conductive and/or dielectric layer can influence the overall permeability of the membrane structure to the passage of the chemical, biological and/or other particulate species for which the system is designed.

Yet another function of the dielectric layer may be to adsorb, absorb, or react with harmful and undesired species that may diffuse into the membrane structure when the membrane is in the unactuated state. Hence, the dielectric layer may include activated carbon, high surface silica, molecular sieves, xerogels, ion exchange materials, powdered metal oxides, powdered metal hydroxides, antimicrobial agents, and the like, which may be in the form of nanoparticles if so desired.

Figure 6:
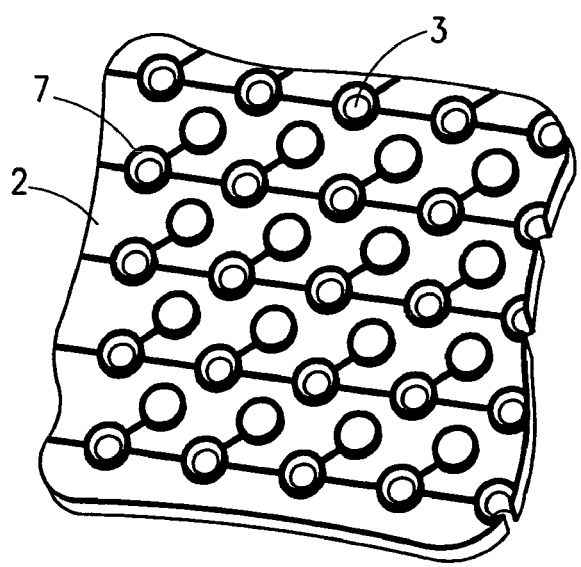
FIG. 6 is a schematic diagram of a membrane of an adaptive membrane structure in which a conductive layer is applied to the membrane in an annular pattern around each hole.
Figure 7:
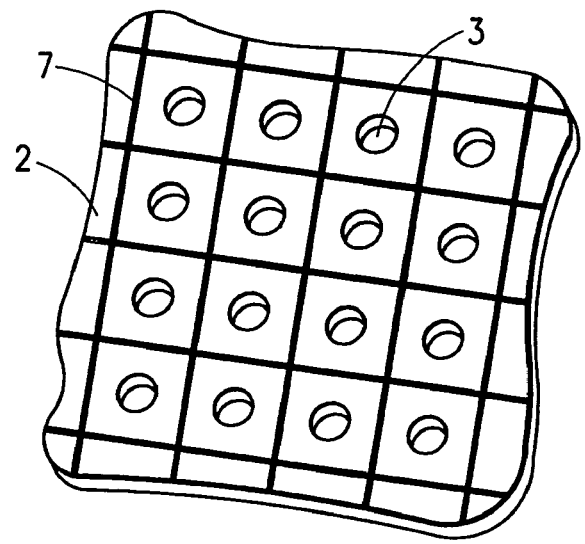
FIG. 7 is a schematic diagram of a membrane of an adaptive membrane structure in which a conductive layer is applied to the membrane in parallel lines.

Alternatively, the conducting layers need not cover the entire surface of a substrate membrane but instead may be selectively applied in a pattern, which only partially covers the substrate membrane surface. One such example is shown in FIG. 6, in which a conductive layer 7 is applied to a substrate membrane 2 in an annular pattern around each hole 3. All the annuli are connected to each other using electrically conducting lines applied to the substrate membrane 2 such that all the annular patterns are electrically connected to each other in series so that all annuli can be held at the same electrical potential by appropriate connection to a voltage source at some point in the network of lines and annuli. Another possible patterned electrode is shown in FIG. 7, in which the conducting layer 7 comprises two arrays of parallel electrically conducting lines applied to the substrate membrane 2 traversing the space between the holes. In the particular pattern shown in FIG. 7, it is seen that any line from either array intersects and is perpendicular to the lines in the other array. Again, all points in this network of lines may be held at a single electrical potential by appropriate connection to a voltage source. The use of a patterned conducting layer as shown in FIGS. 6 and 7, as opposed to a continuous electrode as shown in FIG. 4, can increase the desirable permeability of the structure in the actuated state to species such as water vapor, since the barrier afforded by the electrode material to transport of these desirable species is removed over much of the substrate membrane surface. There are many other geometric patterns that could be used to provide electrodes in this invention.

The method for laying down conductive features, lines and patterns onto surfaces is well known in the electronic manufacturing art. Some of the processes that may be used for creating conductive features include without limitation letterpress printing, screen printing, gravure printing, offset lithography, flexography, electrophotography and laser jet printing. Several additional variations of lithographic printing for laying down micron and submicron conductive features onto surfaces are also well known in the art.

Figure 12:
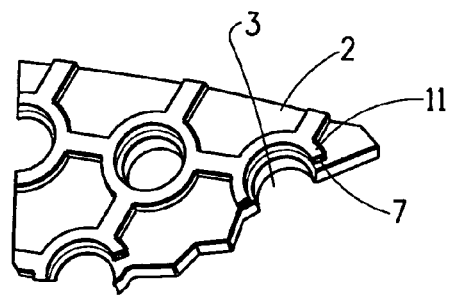
FIG. 12 is a schematic diagram of a portion of a substrate membrane of an adaptive membrane structure in which a patterned dielectric layer is applied to a patterned electrode layer applied to a substrate membrane.

Dielectric layers, if they are incorporated in the structure as described above, also need not cover the entire surface of the substrate membrane. In particular, if a patterned electrode is used in a membrane structure, a patterned dielectric layer may be used which covers the patterned electrodes to electrically isolate them from their surroundings, but the dielectric layer need not cover all of the remaining substrate surface, which is not covered by the patterned electrode layer. FIG. 12 shows an example of a patterned dielectric layer 11 applied to a patterned electrode layer 7 applied to a substrate membrane 2 in a similar design. It will be noted that the patterned dielectric in this example covers an area slightly larger than the patterned electrode to insure isolation of the electrode. Note that the patterned dielectric layer may also have functions in addition to electrical isolation as described above for dielectric layers that cover the entire substrate surface. In particular, it may serve to enhance the sealing of the membrane surface to the adjacent membrane surface. The aforementioned processes for patterning conductive layers may also be used to pattern dielectric layers onto membrane substrates.

Note that the materials and thickness of substrate membranes 2, 2' and 2" may be the same or different. Likewise, the materials and thickness of conducting layers 7, 7', and 7" may be the same or different. Likewise, the materials and thickness of the dielectric layers 11, 11', and 11" may be the same or different. Furthermore, the choice of which side of the substrate membrane to use for placement of the dielectric layer, for any or all of the three membranes, may be reversed as previously disclosed above.

This invention is not limited to adaptive membrane structures having only two membranes. The design disclosed in FIGS. 3 and 4 may be extended to four or more membranes as well by addition of appropriate component substrate membranes, conducting layers, dielectric layers, hole arrays, potential sources, switches and conductors. Furthermore, the conducting and dielectric layers may cover the entire substrate membrane surface to which they are applied or they may be patterned following, for example, the designs previously disclosed. Multiple membrane systems enable adaptive barrier systems, which can selectively impede the passage of different chemical, biological and/or other particulate species by actuating different combinations of adjacent membrane closures. Such systems may include, in addition to one or membranes in addition to two that are brought into contact, one or more layers of fabric.

The embodiments disclosed above may thus include, for example, in addition to first, second and third membranes (2, 2' and 2"), a fourth membrane 2''' having holes, and means to respond to an actuating stimulus that moves the fourth membrane away from a second or third membrane into a position in which it is separated from the second or third membrane by a gap between them.

As the adaptive membrane structure may contain one or more membranes and/or layers in addition to two membranes that are separated by the actuating stimulus, it is not required that more than two membranes have a conductive coating, or that the membranes that have a conductive coating are the membranes that also have holes. That is, the structure may contain one or more layers and/or membranes in addition to a membrane with holes that is moved by the application of the actuating stimulus occurs. Whatever is required to make at least one of the membranes with holes move away from another membrane with holes to form a gap is, however, part of the adaptive membrane structure. The permeability of the structure is thus determined with respect to all such components, be they just the two membranes with holes or additional layers, membranes and/or other materials or components.

Although an applied electric field is a preferred form in which the actuating stimulus will operate, there are numerous other types of actuating stimuli that are useful for the purpose of causing the movement of membranes in the structure. Other possible actuating stimuli include without limitation a magnetic force, hydrostatic force, or hydrodynamic force, and two or more different kinds of actuating stimuli may be used on a membrane structure.

For example, certain polymers can absorb considerable amounts of water and other solvents, and can thereby swell to volumes that are significantly greater than the original dry volume. In so doing, the expansion and change of dimension of such a swellable polymer can transmit a hydrostatic force that would cause membrane movement.

Changes in temperature can also serve as another form of an actuating stimulus. Certain synthetic materials, naturally-occurring materials and engineered structures can generate significant forces as they change their dimensions in response to changes in temperature. Such a gain or loss of thermal energy may thus also be used to cause the movement of membranes herein, working through the material as its size is changed thereby.

In another embodiment, an electrostrictive material may be used to transmit a force derived electrically. An electrostrictive material, when subjected to electrical voltage, can undergo size deformation, with a consequent change in dimension, which can produce a force that will transmit the effect of the actuating electrical stimulus and move a membrane.

An embodiment based on the use of a magnetic force as the actuating stimulus can be configured by incorporating a spiral or helical winding of a conducting wire (e.g. copper wire) in the adaptive membrane structure so that the winding is adjacent to the membranes in the structure and oriented such that the axis of the winding is normal to the plane of the membranes. The winding is electrically connected in series with a switch and a source of electrical power such as a battery. A magnetic material is incorporated in one or more of the membranes in the structure, and the membranes are appropriately located within the structure such that their motion under action of the force of magnetic attraction will cause them to come in contact with each other or with one or more other membranes, or be moved away and separated from other membranes. The magnetic material could be incorporated within the bulk of a membrane or as a coating on a membrane surface. Possible magnetic materials include carbonyl iron particles dispersed within the bulk of a membrane or within a matrix comprising a coating on a membrane surface. Upon actuation of the system by closure of the switch, a magnetic field will develop in the vicinity of the winding, and this field will generate a force on the magnetic material incorporated in one or more membranes thereby causing the membrane(s) containing the magnetic materials to come in contact with, or be moved away from, one or more adjacent membranes.

The examples discussed above also illustrate a corresponding variety in the means that is provided to respond to the actuating stimulus, examples of which included above are a swellable polymer, a material that changes size in response to temperature change, an electrostrictive material and a magnetic material. Also suitable for use as means responsive to an actuating stimulus is a thermoelectric material, which can generate electrical energy when subjected to a change in temperature, and thus transmit to membranes the force of a useful voltage that is representative of a gain in thermal energy.

The means responsive to the actuating stimulus are typically located in, on, within or adjacent to the adaptive membrane structure in the sense that they must be in close enough physical proximity to enable application of the force of the actuating stimulus to move at least one membrane. A conductor or magnetic particles may, for example, be printed on a membrane that has holes, may be printed on another membrane or layer that does not have holes, or may be formed itself as a separate membrane or layer. Further, a polymer or layer that changes shape and/or size may be located adjacent to a membrane that has holes, although other membranes or layers that do not have holes may be located there between provided that the mission of the polymer or material to apply a moving force to the membrane with holes is not hindered.

In view of the variety of forms in which the actuating stimulus may exist, as described above, another embodiment of this invention is an adaptive membrane structure that includes first and second movable membranes, and means to respond to an electrical, a magnetic, a hydrodynamic or a hydrostatic force. This also enables, in a membrane structure that includes first and second movable membranes, a method for moving the first membrane toward or away from the second membrane by applying an electrical force, a magnetic, a hydrodynamic or a hydrostatic force to the first membrane.

Whatever form the actuating stimulus takes, it operates in one embodiment to a substantially uniform extent on all portions of at least one membrane. In particular in this embodiment, the actuating stimulus operates to a substantially uniform extent on the portion of a membrane proximal to each of the holes thereof, and thus in a regular pattern all across the surface of the membrane. The operation of the actuating stimulus is only substantially uniform because the membrane is pliable and will in many cases not form a perfect plane on which the applied force may operate equally on all infinitely small units of area across the surface of the plane. The intention in such case, however, is that the entire membrane move as a result of the application of the actuating stimulus.

In another embodiment, however, the actuating stimulus does not operate to a uniform extent on all portions of the membrane, and one or more portions of one membrane are moved into contact with, or away from, a corresponding portion or portions of another membrane in a position in which the holes of each portion of the first membrane are substantially out of registration, or are out of registration, with the holes of the corresponding portion of the second membrane. If there is more than one portion of the membrane where contact is made, the portions may, but need not, be selected in the form of regularly repeating geometric pattern. When the portions are distributed across the surface of the membrane in a regular pattern, it then becomes possible to regulate the permeability of the membrane structure by arranging for the actuating stimulus to be operative in only certain selected portions of the membrane at one time. It also becomes possible to rotate the application of the actuating stimulus, in a repeating sequence of actuation and deactuation, among the various portions on a programmed basis. This is most easily accomplished where an electrical force is the actuating stimulus, and circuity is provided that enables current to be supplied to or withdrawn from portions of the membrane with whatever spatial and timing arrangement is desired.

In particular, the adaptive membrane structure can be designed to display multiple states of gas, vapor and/or liquid permeability in addition to and different from those exhibited when the adaptive membrane structure is in the fully actuated, fully unactuated or fully deactuated state. In one embodiment, an adaptive membrane structure may be formed to have two or more portions or subsections, where each subsection of the structure is itself an adaptive membrane structure that displays some or all the features described herein. The permeability of the structure as a whole may be altered by changing the permeability of some or all of the subsections of the structure, and by doing so at different times. An actuating stimulus can be applied to each subsection of the membrane structure independently of all the other subsections. Hence, several different states of permeability may be obtained for the structure as a whole by moving membranes in some of the subsections, while not moving membranes in other of the subsections, that together make up the adaptive membrane structure as a whole. In another embodiment, however, all membranes in all subsections may be moved at the same time.

Figure 13:
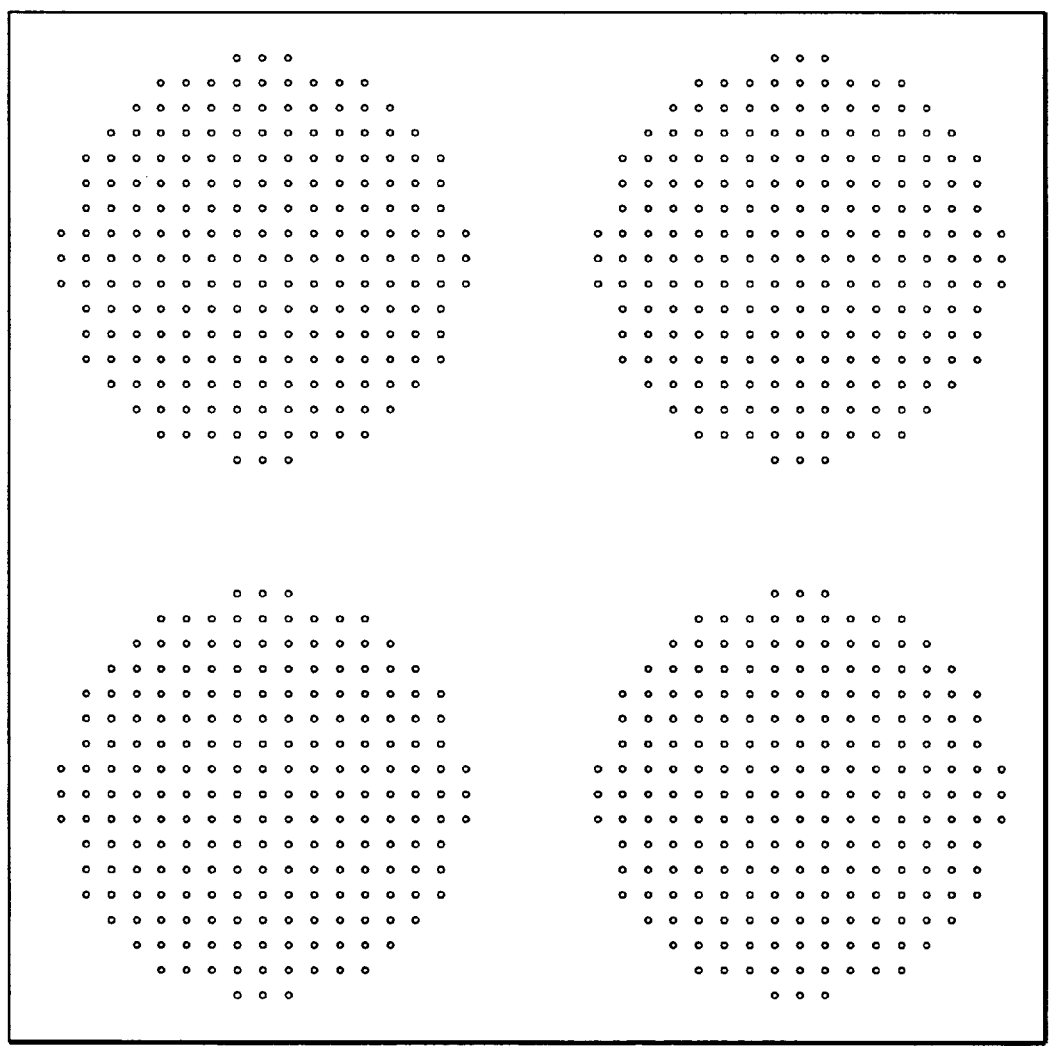
FIG. 13 shows a plan view of an adaptive membrane structure that has four subsections and each subsection has an array of holes.

One example of an adaptive membrane structure that has several such subsections is illustrated in FIG. 13. The figure shows a plan view of a membrane that has four subsections, and each subsection consists of an array of holes. Two or more membranes such as the membrane illustrated in FIG. 13 can be provided in the structure such that the array of holes in each subsection of one membrane are substantially out of registration, or are out of registration, with the array of holes of the corresponding subsection on another adjacent membrane. A separate actuating stimulus, and means responsive thereto, can be provided for each subsection of a membrane. For example, in an embodiment where the actuating stimulus is an applied electrical field, each of the four subsections may have its own conductive features that may or may not be connected to the conductive features of the other subsections in the membrane. By assembling the membrane illustrated in FIG. 13 with at least one and possibly more corresponding membranes, and by connecting the resulting adaptive membrane structure to an appropriate electrical circuit, it is possible to apply an actuating stimulus to any one, any two, any three or all four of the subsections of the membrane structure. In so doing, they will be able to demonstrate at least 5 different states of permeability for such an adaptive membrane structure with four subsections.

The membrane of FIG. 13 is shown having four similar subsections. However, the individual membranes in a structure need not have exactly the same subsections. An adaptive membrane structure may be assembled such that the individual subsections of one membrane are completely different from other subsections on the same membrane as long as the corresponding subsections on adjacent membranes have arrays of holes that are substantially out of registration, or are out of registration, with each other.

A membrane with multiple subsections may be formed by creating an array of holes for each subsection on a single continuous sheet of material. A membrane comprising several subsections may also be formed by first creating individual subsection membranes and then joining the subsections to create a larger sheet or layer. The subsections may be joined to each other using reactive or non reactive adhesives or using different welding techniques such as radio frequency welding, ultrasonic welding and vibration welding.

Figure 8A:
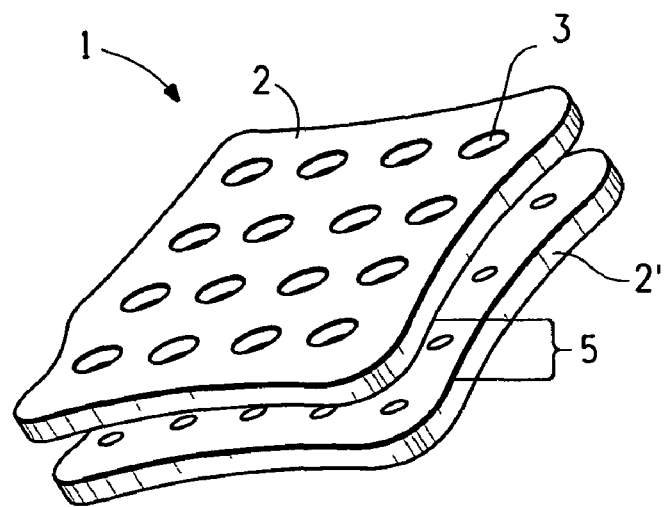
FIG. 8 is a schematic diagram of an adaptive membrane structure that contains an array of protruding features showing the positions of the membranes in the absence of an actuating stimulus (8A: perspective view and 8B: sectional view).
Figure 8B:
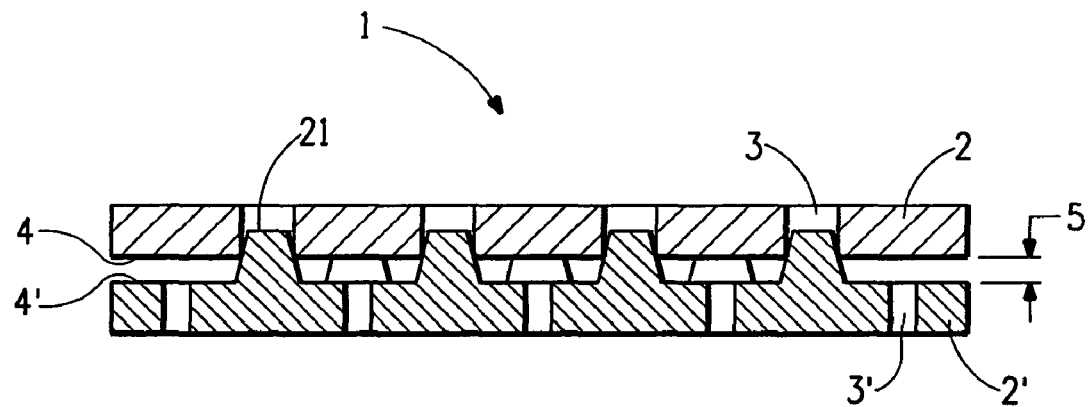
Figure 9A:
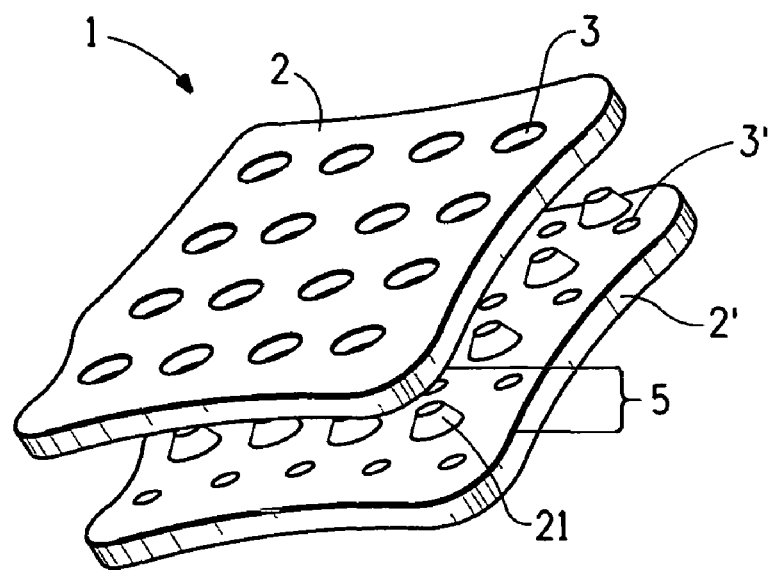
FIG. 9 is a schematic diagram of an adaptive membrane structure that contains an array of protruding features showing the positions of the membranes as a result of the application of an actuating stimulus (9A: perspective view and 9B: sectional view).
Figure 9B:
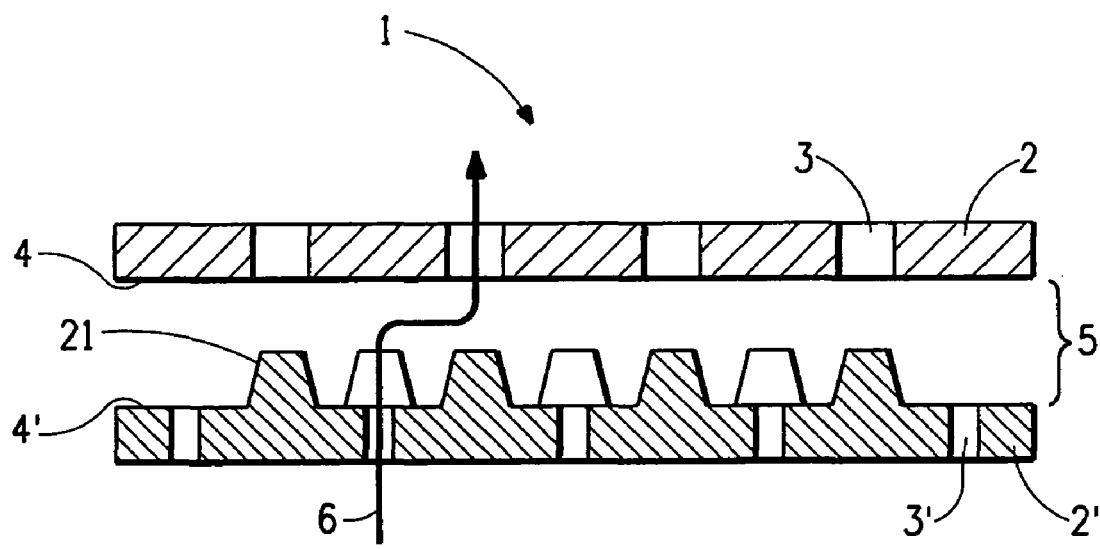

Embodiments of the present invention as described above, those for example shown in FIGS. 1 and 2, involve at least two largely planar membranes that, as a result of being moved by the actuating stimulus, are separated from each other along adjacent, largely planar, surfaces 4 and 4' and thereby create a gap 5 that had not previously existed, or extend a small gap that had previously existed, between these surfaces in the unactuated state. The contact of the membranes in the unactuated state also eliminates paths such as path 6 that, in the actuated state, would permit enhanced permeation, convection and/or diffusion associated with the array of holes incorporated in the membranes 2 and 2'. An alternative embodiment for the adaptive membrane structure is shown in FIGS. 8 and 9 in the unactuated and actuated states, respectively. In this embodiment, one or both of two adjacent membranes contain an array of protruding members 21 in the form of a post, knob or bump. In the actuated state of this embodiment, depicted in FIG. 9, the adjacent membranes are separated from each other such that paths for enhanced permeation, convection and/or diffusion such as path 6 exist. However, as shown schematically in FIG. 8, each protruding member 21 in the array is shaped and positioned so as to be insertable in and enter a hole in the adjacent membrane upon deactuation when one or both membranes are moved toward each other. As each protruding member enters its corresponding hole, it contacts the inner surface of the hole in such a way as to create a seal between the protruding member and its mating hole, thereby eliminating paths 6 for permeation, convection and/or diffusion.

As seen in FIG. 8 in this embodiment, to provide a good seal between membranes 2 and 2', the adjacent membrane surfaces 4 and 4' need not be in contact in the absence of the application or operation of the actuating stimulus and, a small gap 5 between these surfaces may persist in the unactuated state. In this embodiment, a good seal is provided by a tight fit between a protruding member on one membrane and the corresponding hole on the other membrane. Although the protruding member 21 is shown as a truncated cone in FIGS. 8 and 9, other shapes for the protruding member may be used, limited only by the need to form a seal against the mating hole surface. Furthermore, although FIGS. 8 and 9 depict an array of identical protruding members deployed in a regular square pitch array, no two protruding members in the array need have identical geometry, and the array pattern for the protruding members is governed by the array pattern of the holes in the adjacent membrane.

The adaptive membrane structures can be used as components of a variety of articles of manufacture, including without limitation articles of apparel, enclosures, sensor devices, and valves for controlling the flow of gas, vapor, liquid and/or particulates.

The adaptive membrane structures can be used as components of articles of apparel, especially for clothing intended to protect against chemical and biological toxins and pathogens. Such articles include without limitation those selected from the group consisting of protective suits, protective coverings, hats, hoods, masks, gowns, coats, jackets, shirts, trousers, pants, gloves, boots, shoes, shoe or boot covers, and socks.

The adaptive membrane structure can also be used in consumer apparel to protect against the natural elements. In one embodiment, the structure can be used as an inner liner in responsive outerwear apparel used for recreational and other outdoor activities, such that the liner could be made to change its permeability depending upon external temperature and wind conditions, so as to increase the comfort of the wearer. Examples of such outerwear include without limitation coats, jackets, ski pants, gloves, hats, hoods and masks. In another embodiment, a membrane structure could be used as a responsive liner in raingear. In dry external conditions, the liner would be highly permeable, thus breathable, but in wet and rainy conditions, the liner would be made impermeable to external precipitation.

The adaptive membrane can be used for various medical applications. In one embodiment, the structure could be used to fabricate items of apparel for health care workers, including without limitation surgical masks, medical or surgical garments, gowns, gloves, slippers, shoe or boot covers, and head coverings.

For some of the aforementioned applications, the adaptive membrane structures may be used in the absence of any additional porous material layers, while for some other applications a multi-layered system may be created where the adaptive membrane structure forms only one component in the multi-layered system. Examples of porous layers that could be used in conjunction with the adaptive membrane structure are woven fabrics, non-woven films and porous membranes. Additional porous layers may be used with the objective of (i) creating a composite system that protects the adaptive membrane structure from an environment that may degrade its performance, and (ii) creating a composite system that has more features than those that can be offered by the adaptive membrane structure itself.

For example, for the purpose of creating fire retardant apparel that also protects a firefighter from noxious fumes and vapors, the adaptive membrane structure can be layered with or sandwiched between fire retardant fabrics. In this case, the outer fire retardant fabric protects the wearer and the adaptive membrane structure from the fire. For the purpose of creating commercial apparel that protects against the natural elements, the structure may be sandwiched between woven fabrics. The outer and the inner fabric may be chosen to impart a comfortable feel as well as to provide a fashionable appearance to the apparel. Colored and patterned fabrics may also be used as outer layers to introduce additional camouflage feature to chemical and biological protective apparel for the soldier. In some cases, microporous membranes may be used to protect the adaptive membrane structure from dust and liquids.

An adaptive membrane structure as disclosed herein can be incorporated into an article of apparel by any of the knitting, sewing, stitching, stapling or adhering operations known in the art. It is common in the art to use fabrics or other materials having multiple layers from which to make apparel, and the structure can be incorporated therein by conventional methods.

The potential uses of the adaptive membrane structures disclosed herein are numerous and are not limited to protective apparel for humans. In other embodiments, the adaptive membrane structure can be used to create or construct an enclosure for the occupancy of humans, animals or perishables. The term "perishables" as used herein includes not just edible materials but any material that is sensitive to, or may be damaged or degraded by exposure to, the environment. Such enclosure would include for example collective shelters, such as tents, that protect groups of individuals against chemical and biological warfare agents. In another embodiment, the invention could be used to set up safe rooms in commercial and residential buildings. For example, the safe rooms assembled using the adaptive membrane would be permeable under non-threatening conditions but would become impermeable when toxic agents are released in the external environment. In another embodiment, a tarpaulin comprising the adaptive membrane structure can be used to protect stored equipment.

The adaptive membranes can also be used to create an external water barrier layer in the construction of commercial and residential buildings such as dwellings and office buildings. The vapor barrier, or vapor-retardant layer, in a building should be impermeable enough to prevent precipitation from outside of the building to permeate inside, but yet should be breathable enough to allow excess moisture in the walls to permeate to the outside. Therefore, in one embodiment, the adaptive membrane can be used as a responsive vapor barrier in commercial and residential buildings such that the barrier layer can exist in multiple states. When there exists excess moisture in the building walls, the barrier layer would be made vapor permeable, and when there is high humidity in the external environment, the barrier layer would be made impermeable.

Adaptive membranes disclosed herein, when constructed from transparent polymer films, could also be used to construct agricultural and horticultural greenhouses. Temperature control in a greenhouse is an important issue for optimum plant growth. Existing greenhouses are constructed from polymer films of low gas and vapor permeability. Since such polymer films are not breathable, the temperature in a greenhouse is conventionally controlled by the opening and closing of engineered vents. This often leads to undesirable temperature gradients in the greenhouse. If an adaptive membrane structure is used to construct the greenhouse, the internal temperature could be more evenly controlled by changing the permeability of the membrane that envelops the greenhouse. As the temperature in the greenhouse rises, the membrane could be made more permeable, thereby allowing the process of free convection to reduce the temperature in the greenhouse. Similarly, as the temperature in the greenhouse falls, the membrane could be made less permeable, allowing the temperature in the greenhouse to rise.

In yet another embodiment, an adaptive membrane structure could be used in temporary, soft-walled construction, or in permanent construction, to create a clean room in which to perform surgical procedures, or in which to conduct activities requiring high air purity such as computer chip fabrication.

The adaptive membranes can also be used for managing the environment in small and large storage areas and containers such as those used for storing perishables. The term "perishables" as used herein includes not just edible materials but any material that is sensitive to, or may be damaged or degraded by exposure to, the environment. For example, edible materials such as fresh fruits and vegetables may need to be stored under optimum humidity levels to maintain freshness and enhance their shelf life. Adaptive membranes disclosed herein can be used to create storage areas or storage containers that respond to the local environment conditions. For example, when the local water vapor concentration in the stored area is above the desired level, the adaptive membranes will actuate to release excess water vapor to the surrounding environment, and will deactuate once the water vapor drops below the desired level. Such responsive storage devices could be used to ship edible materials or other perishables from one place to another or to store them in commercial and residential settings such as cold storage areas and refrigerators.

The adaptive membrane structures can also be used to enhance the life and performance of a sensor device, and in this sense a sensor device may be viewed as a perishable. The active components in a sensor device are very sensitive to their environment and can be poisoned by liquid or vapor or particulate species in the environment. Such devices can also be corrupted when exposed to high concentrations of the species they are designed to sense. In one embodiment, an adaptive membrane structure, by its ability to have different states of permeability in the actuated and the deactuated states, can be used to control the flow of species to an enclosure housing the active component of a sensor. In another embodiment, an adaptive membrane structure can be used as a protective layer or a shroud around the active component. For this application, when it is desired that the sensor be in the active state for sensing, the adaptive membrane structure may be left in the actuated state allowing the active component of the sensor to come in contact with species in the environment that need to be sensed. But when the sensor is no longer in the active or sensing state, the adaptive membrane structure can be deactuated to provide closure between membranes thereby protecting the active component of the sensor and enhancing its life.

An adaptive membrane structure may also be used for controlling the flow of a gas, vapor, liquid and/or particulate such as in valve and airfoil applications. The structure can be used to modulate the flow of a gas entering a plenum as encountered in heating, air conditioning and ventilation systems as well as plenums encountered in industrial processes such as the quench system of a fiber spinning process. In these applications, the gas flow to be modulated is largely normal to the membranes of the structure, and the flow rate is altered by changing the magnitude of the force of that flow, as the actuating stimulus, and thereby altering the resistance to flow of the structure. In addition, the structure can be used to modulate the lift experienced by various airfoils including those used as sails on sail boats, wind surfers, and other wind powered water craft as well as wings used on powered and un-powered aircraft. In these applications, the gas flow is largely tangential to the membranes of the structure that comprises or is incorporated into the airfoil, and the lift is altered by changing the magnitude of the force of the flow, as the actuating stimulus, thereby altering the pressure differential across the airfoil.

An adaptive membrane structure can also be used as a valve to control the rate of release of a vapor, aerosol or liquid, such as those used as fragrance compounds, perfumes, room fresheners, insecticides, pesticides, insect repellants or pharmaceuticals. In one embodiment, a controlled release device would include an adaptive membrane structure, which would separate the agent to be released from the surrounding environment. When the structure is in the actuated state, the agent would be released to the environment by means of diffusion and or convection. However, when the structure is in the deactuated state, transport of the agent to the environment would be reduced or stopped. The rate of release of the agent would be controllable by adjusting the frequency with which the structure in the controlled release device is oscillated between the actuated state and the deactuated state.

The use of the adaptive membrane structure in connection with physical assets or devices such as enclosures, buildings, sensors and valves can be achieved by fabrication and construction methods known in the art. The adaptive membrane structure may be interleaved between other layers or structural elements such as when a building wrap is installed between the interior and exterior portions of a wall. Or when the adaptive membrane structure is used in an essentially free-standing application such as in a tent, tarpaulin, greenhouse, valve or protective cover for a sensor, installation may be achieved by anchoring it to a suitable frame.

The use of the adaptive membrane structure for valve purposes enables a method for controlling the flow of gas, vapor, liquid and/or particulates through first and second membranes having holes by (a) providing the holes in each membrane in a position in which the holes are substantially out of registration, or are out of registration, and (b) moving the membranes into and out of contact with each other.

Where an apparatus or method of this invention is stated or described as comprising, including, containing, having, being composed of or being constituted by certain components or steps, it is to be understood, unless the statement or description explicitly provides to the contrary, that one or more components or steps other than those explicitly stated or described may be present in the apparatus or method. In an alternative embodiment, however, the apparatus or method of this invention may be stated or described as consisting essentially of certain components or steps, in which embodiment components or steps that would materially alter the principle of operation or the distinguishing characteristics of the apparatus or method would not be present therein. In a further alternative embodiment, the apparatus or method of this invention may be stated or described as consisting of certain components or steps, in which embodiment components or steps other than those as stated or described would not be present therein.

Where the indefinite article "a" or "an" is used with respect to a statement or description of the presence of a component in an apparatus, or a step in a method, of this invention, it is to be understood, unless the statement or description explicitly provides to the contrary, that the use of such indefinite article does not limit the presence of the component in the apparatus, or of the step in the method, to one in number.

What is claimed is:

1. An article of manufacture which is selected from the group consisting of apparel and enclosures, said article comprising:

an adaptive membrane structure comprising first, second, and third membranes;

an actuating stimulus and a means to respond to an actuating stimulus, wherein the actuating stimulus and the means to respond to an actuating stimulus are at least one selected from the group consisting of:

(i) an electrostatic force is the actuating stimulus, and the means to respond to an actuating stimulus is an electrically conductive material that is incorporated in, on, or adjacent to the adaptive membrane structure, or (ii) a magnetic force is the actuating stimulus, and the means to respond to an actuating stimulus is a magnetic material that is incorporated in, on, or adjacent to the adaptive membrane structure;

a source of electrical potential; and a sensor configured to detect a change in the temperature, humidity, or concentration of a selected chemical, biological or particulate species in the environment in which the article is located, and activate the actuating stimulus;

wherein in an unactuated state, the first membrane is in contact with the second membrane, but not in contact with the third membrane such that that there is a gap between the first membrane and the third membrane;

wherein in an actuated state, the source of electrical potential, the sensor, the actuating stimulus, and the means to respond to an actuating stimulus are configured to move the first membrane, or a portion thereof, into contact with the third membrane, thereby creating a gap between the first and second membranes; and wherein: (a) each membrane has holes, (b) the holes of the first membrane are substantially out of registration, or are out of registration, with the holes of the second membrane, (c) the holes of the first membrane are at least partially in registration with the holes of the third membrane, and (d) each membrane comprises at least one polymer; and wherein the means to respond to an actuating stimulus is in physical proximity to the adaptive membrane structure to enable application of the force of the actuating stimulus to move the first membrane or a portion thereof.

2. The article of claim 1 wherein at least one membrane has an electrically conductive coating on a surface thereof, wherein the conductive coating is applied in a pattern that covers selected areas of a membrane's surface and wherein the conductive coating is itself coated with one or more layers of dielectric material.

3. The article of claim 1 wherein at least one membrane comprises at least one member of the group consisting of activated carbon, high surface silica, molecular sieves, xerogels, ion exchange materials, powdered metal oxides, powdered metal hydroxides, and antimicrobial agents.

4. The article of claim 1 which is selected from the group consisting of protective suits, protective coverings, hats, hoods, masks, gowns, coats, jackets, shirts, trousers, pants, gloves, boots, shoes socks, raingear, medical and surgical garments, tents, tarpaulins, safe rooms, clean rooms, greenhouses, dwellings, office buildings, storage containers and controlled release devices.

* * * * *